(12) United States Patent
Mohebbi

(10) Patent No.: US 8,682,311 B2
(45) Date of Patent: Mar. 25, 2014

(54) MULTI-HOP BOOSTER

(75) Inventor: Behzad B. Mohebbi, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 1363 days.

(21) Appl. No.: 12/110,259

(22) Filed: Apr. 25, 2008

(65) Prior Publication Data

US 2009/0036114 A1 Feb. 5, 2009

Related U.S. Application Data

(60) Provisional application No. 60/926,273, filed on Apr. 25, 2007.

(51) Int. Cl.
*H04W 4/00* (2009.01)
*H04B 3/36* (2006.01)
*H04B 7/14* (2006.01)

(52) U.S. Cl.
USPC .............. 455/422.1; 455/7; 455/24; 375/211; 375/230

(58) Field of Classification Search
USPC ...................... 455/422.1, 7, 24; 375/211, 230
See application file for complete search history.

(56) References Cited

U.S. PATENT DOCUMENTS

| | | | |
|---|---|---|---|
| 5,551,067 A | 8/1996 | Hulkko et al. | |
| 5,950,124 A | 9/1999 | Trompower et al. | |
| 6,185,408 B1* | 2/2001 | Leopold et al. | 455/12.1 |
| 6,441,662 B2 | 8/2002 | Ikeda | |
| 6,879,573 B1 | 4/2005 | Huo | |
| 2003/0053493 A1* | 3/2003 | Graham Mobley et al. | 370/538 |
| 2005/0227706 A1* | 10/2005 | Syrjarinne | 455/456.1 |
| 2006/0030262 A1* | 2/2006 | Anderson et al. | 455/21 |
| 2006/0120560 A1 | 6/2006 | Davis et al. | |
| 2006/0172781 A1* | 8/2006 | Mohebbi | 455/571 |

FOREIGN PATENT DOCUMENTS

| | | | |
|---|---|---|---|
| JP | 2006005932 A | | 1/2006 |
| JP | 2006-520171 A | | 8/2006 |
| WO | WO2005/025078 | * | 3/2005 |
| WO | WO-2005/025078 A2 | | 3/2005 |

OTHER PUBLICATIONS

International Search Report for related patent PCT/US2008/61675 performed by International Searching Authority/US on Jun. 25, 2008.
Written Opinion of International Searching Authority for related patent PCT/US2008/61675 performed by International Searching Authority/US on Jun. 25, 2008.

* cited by examiner

*Primary Examiner* — Ariel Balaoing
(74) *Attorney, Agent, or Firm* — Mintz Levin Cohn Ferris Glovsky and Popeo, P.C.

(57) ABSTRACT

A two-way wireless repeater and booster system and method with watermarking of uplink signals are disclosed. The repeater includes a network unit having at least one wireless receiver and at least one wireless transmitter, the network unit being configured to communicate with the network transceiver. The transceiver further includes a user unit having at least one wireless receiver and at least one wireless transmitter, the user unit being configured to communicate with the user transceiver, and a two-way communication path between the network unit and the user unit to communicate signals between the network transceiver and the user transceiver in autonomous hops comprising between the network transceiver and the network unit, between the user transceiver and the user unit, and between the network unit and the user unit. The network unit and/or user unit is further configured to repeatedly transmit a training sequence to the other unit to train the at least one channel equalizer of the other unit.

12 Claims, 5 Drawing Sheets

MULTI-HOP BOOSTER

CROSS REFERENCE TO RELATED APPLICATIONS

This application claims the benefit under 35 U.S.C. Section 119(e) of a provisional application U.S. Ser. No. 60/926,273, entitled "MULTI-HOP BOOSTER," filed Apr. 25, 2007, which is incorporated by reference herein.

BACKGROUND

This document describes a novel two-way wireless repeater and booster.

Most 3G and so called 4G systems (4G systems are mostly based on Orthogonal Frequency Division Multiplexing (OFDM) modulation) support high data rates, and as such have communication channels much larger in bandwidth (BW) compared to the 2G systems such as GSM. For example, a Wideband Code Division Multiple Access (WCDMA) channel at 5 MHz is 25 times larger than the GSM 200 kHz, while a WiMax channel BW is larger by 50 times or more.

While the aforementioned operation is true about a single communication channel, the Global System for Mobile (GSM) Frequency Hopping (FH) feature enables a GSM device to hop the full allocated spectrum, meaning a single GSM channel will, in the course of a session, operate on much broader BW than a static WCDMA or WiMax channel. This effectively means that a repeater or booster device, that does not have the capability of following the FH algorithm, has to "pass through" the entire spectrum in which the GSM communication channel is allowed to hop over, which is often the entire allocated spectrum to a given operator.

Further, the GSM allocated spectrum for a given operator may or may not be contiguous. Also it is desirable for a repeater and booster device to operate only on an "intended" network provider licensed frequencies, avoiding any operation in channels that are outside the licensed spectrum of the "intended" operator. This requirement means that a repeater (or booster) has to be designed to operate ONLY with a set of specific channels that may or may not be contiguous. FIG. 2 illustrates an example of such a scenario, where a given operator in a given area has three 10 MHz non-contiguous bands, totaling 30 MHz (15 MHz uplink and 15 MHz downlink), and where a GSM derived network can frequency hop on any 75 available channels. Ideally, the repeater shown in FIG. 2 will select, boost and repeat only the channels of interest, as shown.

Further still, since the repeated spectrum is now 15 MHz in a given direction, a digital link between the Network and the User units will require much larger operating BW (15×2×2× 10=600 Mbs/s one way) which, although possible, may not be practical for a small consumer device. It may also be difficult to meet spectral regulations and regulatory requirements such as Dynamic Frequency Selection (DFS) and spectral emission mask in the unlicensed band, if large portions of the spectrum are concurrently used. Therefore, an OFDM based link (or any other digitally modulated link) may not be the most appropriate solution for the middle hop between the Network and the User units.

SUMMARY

This document discloses a novel two-way communications system and method for the middle hop (hop2 in FIG. 1), between User and Network Units (FIG. 1) operating in the unlicensed bands (ISM and/or UNII), and supporting the cellular (or wireless) network communications channels. The system and method enables the support of a wider repeat spectrum (bandwidth) for a given communications bandwidth in the unlicensed band (hop2 in FIG. 1). Also, channel and spectrum select algorithms are disclosed that enable a "network friendly" operation of the booster, which means the booster will not operate and will not repeat other third party network frequencies. This effectively eliminates any unintentional harm caused by the repeater operation in other third party networks. Finally, control and data communications channels and mechanisms are defined for the repeater that allows messages at every protocol layer (including the physical and MAC layers) to be exchanged between the Repeater (Booster) and the operating network.

This document describes a repeater that mediates traffic between a network transceiver and a user transceiver in a cellular wireless communication network. The repeater includes a network unit having at least one wireless receiver and at least one wireless transmitter, the network unit being configured to communicate with the network transceiver. The transceiver further includes a user unit having at least one wireless receiver and at least one wireless transmitter, the user unit being configured to communicate with the user transceiver, and a two-way communication path between the network unit and the user unit to communicate signals between the network transceiver and the user transceiver in autonomous hops comprising between the network transceiver and the network unit, between the user transceiver and the user unit, and between the network unit and the user unit. The hop between the network unit and the user unit is a wireless hop for communicating a signal, and including each of wireless receivers of the user unit and the network unit using at least one channel equalizer to reduce propagation channel time dispersion and fading on the signal. The network unit and/or user unit is further configured to repeatedly transmit a training sequence to the other unit to train the at least one channel equalizer of the other unit. The training sequence is transmitted in a guard time of a communication on the hop between the user unit and the network unit, where the guard time is between timeslots for GSM derivative systems.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The following description is based on a GSM-derivative network of North America operating at PCS bands. With minor modifications, the following described systems and techniques can be applied to GSM/GPRS/EDGE, cdma2000, WCDMA, WiMax and any other cellular and/or wireless communication systems. Patent applications WO2005025078, filed Sep. 3, 2003 and WO2005069249, filed Jan. 12, 2004, by Mohebbi, both entitled "Short-Range Booster" and the contents of which are incorporated by reference herein for all purposes, describe a three-hop short range booster or repeater.

This document describes a novel technique for watermarking an individual channel, or a group of channels, that are supported by the repeater on the uplink. The watermark information then can be used to establish the position of the mobile, assuming the position of the repeater is known to the network, to price discriminate of the call(s) based on the location of the repeater (e.g. residential homes), and to establish that a call is being made through the repeater and hence uses less network resources such as downlink transmit power. If a particular call is supported by the repeater (booster), then it is possible to price discriminate that call, since it requires less network resources. The watermarking information can also be used to aid other positioning techniques such as time difference of arrival (TDOA), assisted global positioning system (AGPS), etc.

Figure 3:
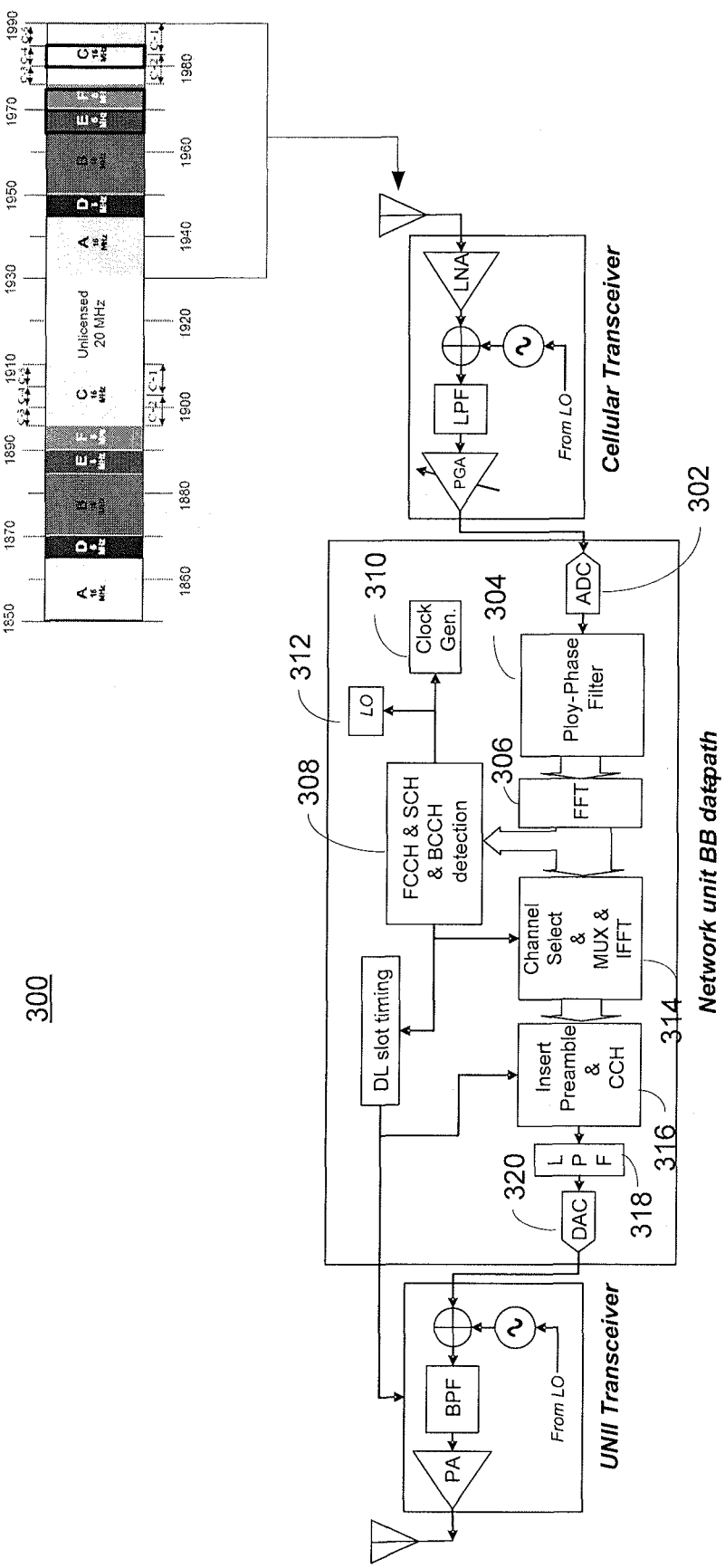
FIG. 3 shows a Network unit downlink datapath.
Figure 5:
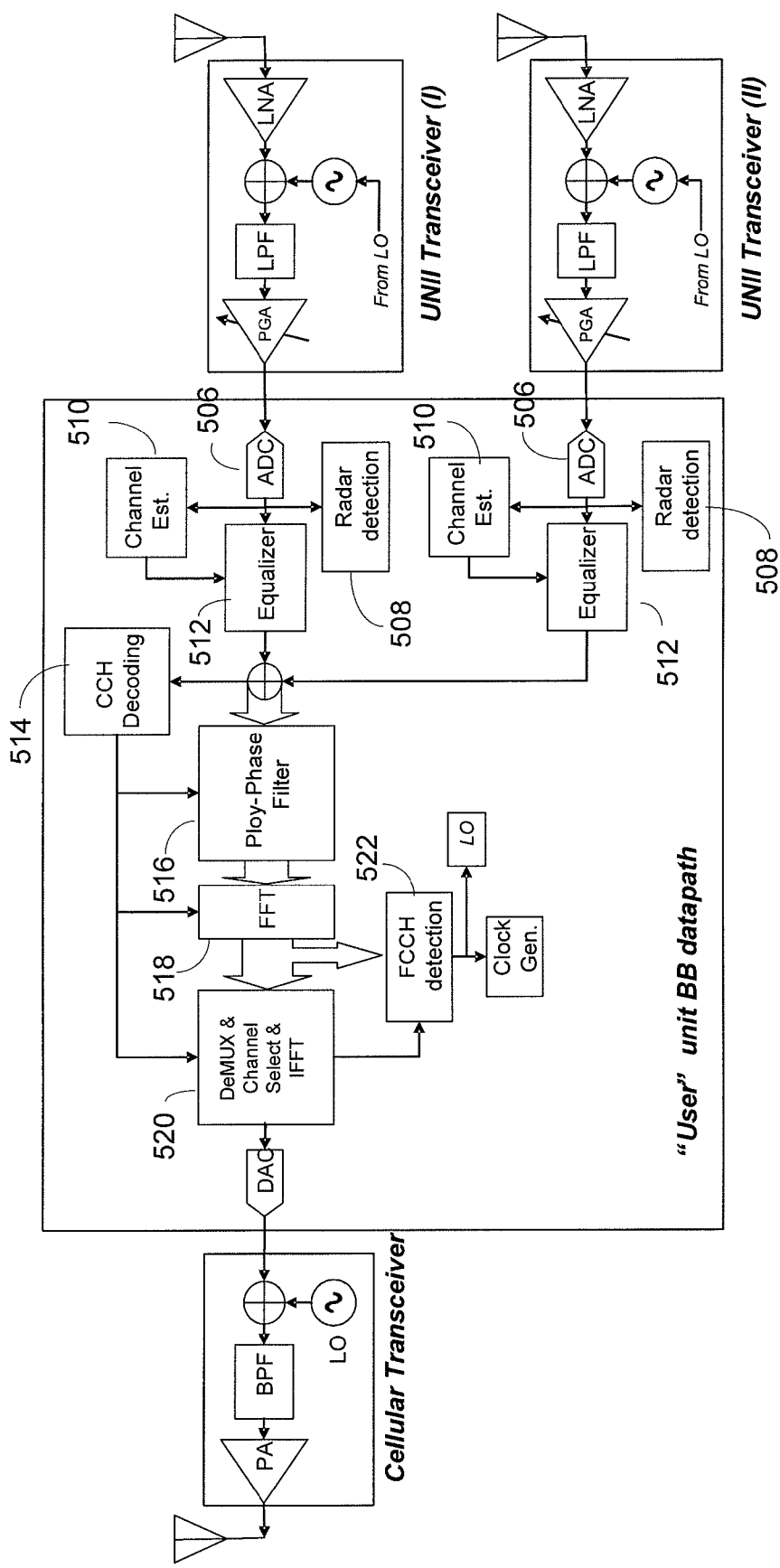
FIG. 5 shows a User unit downlink datapath.

FIG. 3 is a block diagram showing a downlink datapath 300 for the Network unit. The datapath is a complex format. A related complex downlink datapath for the User unit is shown in FIG. 5. In the downlink datapath 300, the repeater (Booster) down-converts (in the RF FE) the entire downlink spectrum of the allocated PCS bands, and digitizes it with an analog-to-digital converter (ADC) 302. It is also possible to down-convert and digitize a continuous portion of the PCS spectrum, over which the system for a given operator is expected to frequency hop. In some cases, it may be more practical to use several RF transceivers in parallel, to cover the blocks of interest of the spectrum.

Figure 2:
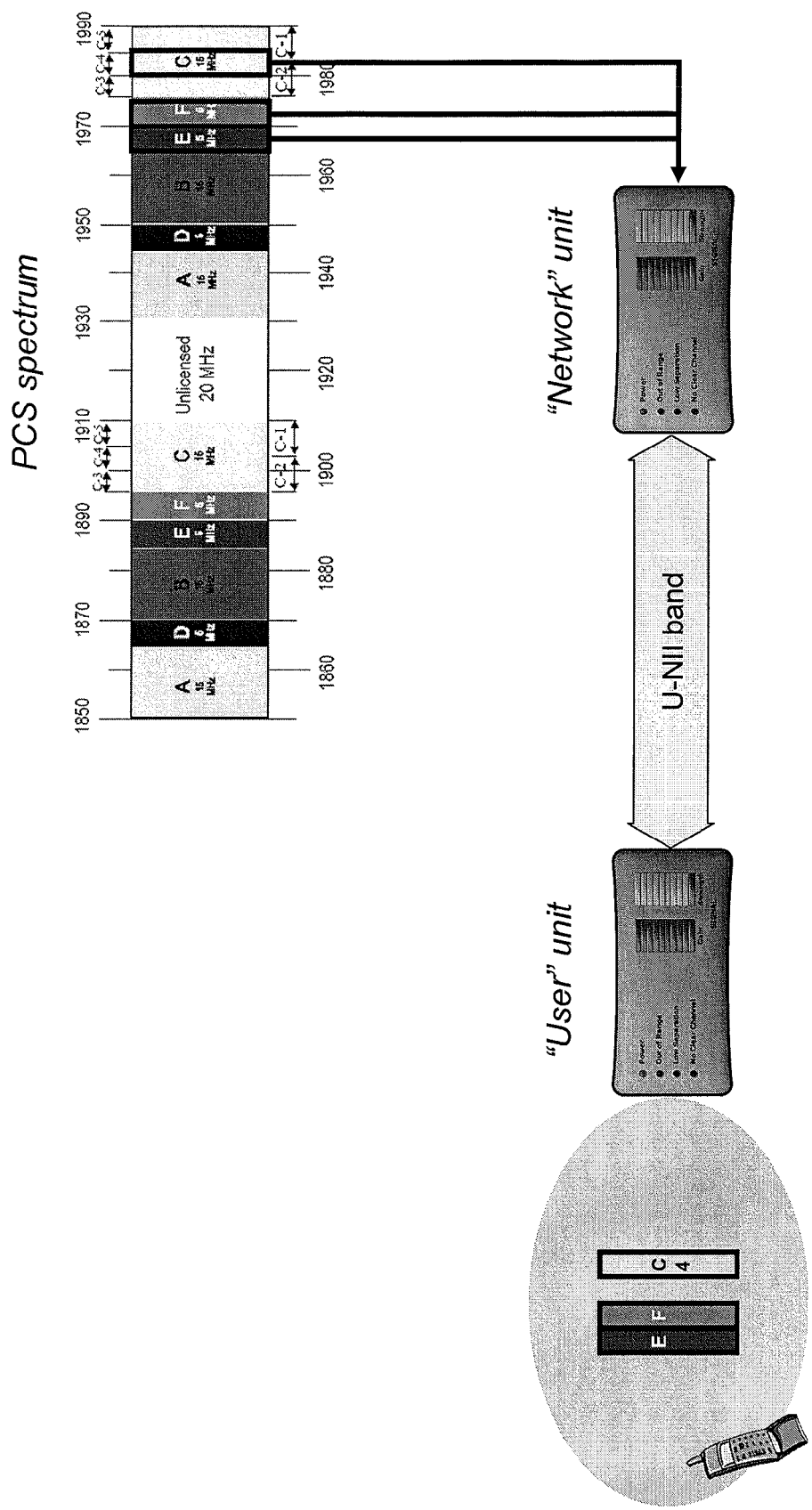
FIG. 2 illustrates new repeater or booster requirements.

Referring back to FIG. 2, only E, F and C-4 blocks of PCS spectrum are of interest, with all other blocks to be avoided in the booster datapath. In order to select the bands of interest, while blocking the other channels, a 200 kHz channelizing filter, preferably a poly-phase filter 304 followed by an FFT block 306, can be connected to the ADC 302. At the output of the FFT block 306, depending on the original spectrum BW, there will be a number of 200 KHz channels. For example if only E, F and C blocks are digitized (i.e. 25 MHz), there will be 125 channels, in which only 75 should be selected and passed through to the User unit. While channelization of the spectrum and the channel selection can also be made at the User unit, it is preferable that these tasks be performed at the Network unit as it also reduces the signal BW from 125 channels to 75 channels, reducing the BW requirement of the UNII channel.

After channelization of the spectrum, the average received signal strength indicator (RSSI) of each channel (frequency control channel (FCCH), synchronization control channel (SCH), and broadcast control channel (BCCH)) is measured and recorded at an "FCC & SCH & BCCH detection" module 308, and based on these RSSI readings, the strongest possible BCCH carrier from the selected channels is identified. After selection of the strongest channel, the FCCH is used to output the reference frequency to a "Clock Generator" module 310, and a local oscillator (LO) 312, where the generated reference frequency is used to correct the local oscillator frequency errors, locking the LO 312 and clocks to the BTS frequency reference.

After this operation, the Synch channel (SCH) is detected and BCCH messages decoded to extract the Mobile Network Code (MNC) and Location Area Identification (LAI) along with other system broadcast information. If the decoded MNC belongs to the desired PLMN, the LAI is used to determine the list of the active channels (75 in this example), in the given area, that have to be supported by the repeater (booster). The list of desired channels is passed to a "Channel Select & MUX & IFFT" module 314 (module 412 in FIG. 4), which selects the channels and modulates them next to each other on carriers that are 200 kHz apart, while increasing the sampling rate and supporting the 15 MHz total BW. The order of the channels as they arrive should be followed, as frequency planning is used to avoid adjacent channels in the same cell, such that the adjacent channels does not interfere with each other.

On the discontinuous spectrum boundary, if two strong channels happen to end up next to each other, the channel assignment order has to be changed by a channel with low RSSI, or a "dummy" channel needs to be inserted between the two strong channels. Care should also be taken to make sure the final waveform does not violate the spectral emission mask of the UNII band. The waveform at this point will contain, at least, all the (75) GSM channels, even though the waveform is different from that of the downlink signal entering the cellular RF FE. In the original signal transmitted from the BTS (and the MS on the uplink), there are power-ramping gaps of 8¼ symbol duration (~30 μsec), where no information is transmitted.

The time-slot (TS) boundary and hence the start of the gaps can be detected by the TS timing extracted from the SCH and used for two purposes:

1) Insertion of the preamble and control channel symbols—this task is performed by an "Insert preamble & CCH" module 316. The preamble can be similar to 802.11a long-symbols of the preamble, although one, two or more symbols can be used. The CCH symbol can also be similar to the 802.11a OFDM symbol, carrying the system information from the Network to User unit. Note that a similar link exists in the uplink between the User and Network units.

2) Switching UNII band transceivers from Tx to Rx and vice versa—This operation is required for radar detection and is performed by transmitting on a UNII channel for a short period (1.154 msec, for example), before switching the transmissions to a second channel for the next transmit period (1.154 msec, for example), and switching the transceiver on the first channel to the Rx mode, receiving the reverse-link transmissions and detecting radar pulses. In the absence of the uplink transmissions, the transceiver switching is based on the downlink TS boundary. However, as soon as the MS commences transmissions on the uplink, the TS transmission times are established and used to move the switching time so as to avoid switching during any uplink time slots, but keeping the switching at one of the downlink slot boundaries.

A low pass filter (LPF) 318 prior to a Digital-to-analog converter (DAC) 320 ensures the spectral transmission mask for UNII band is met, no matter what the composite analogue waveform spectral shape is. To a large extent, the effect of the LPF 318 can be equalized on the receiver side shown in FIG. 5.

Figure 4:
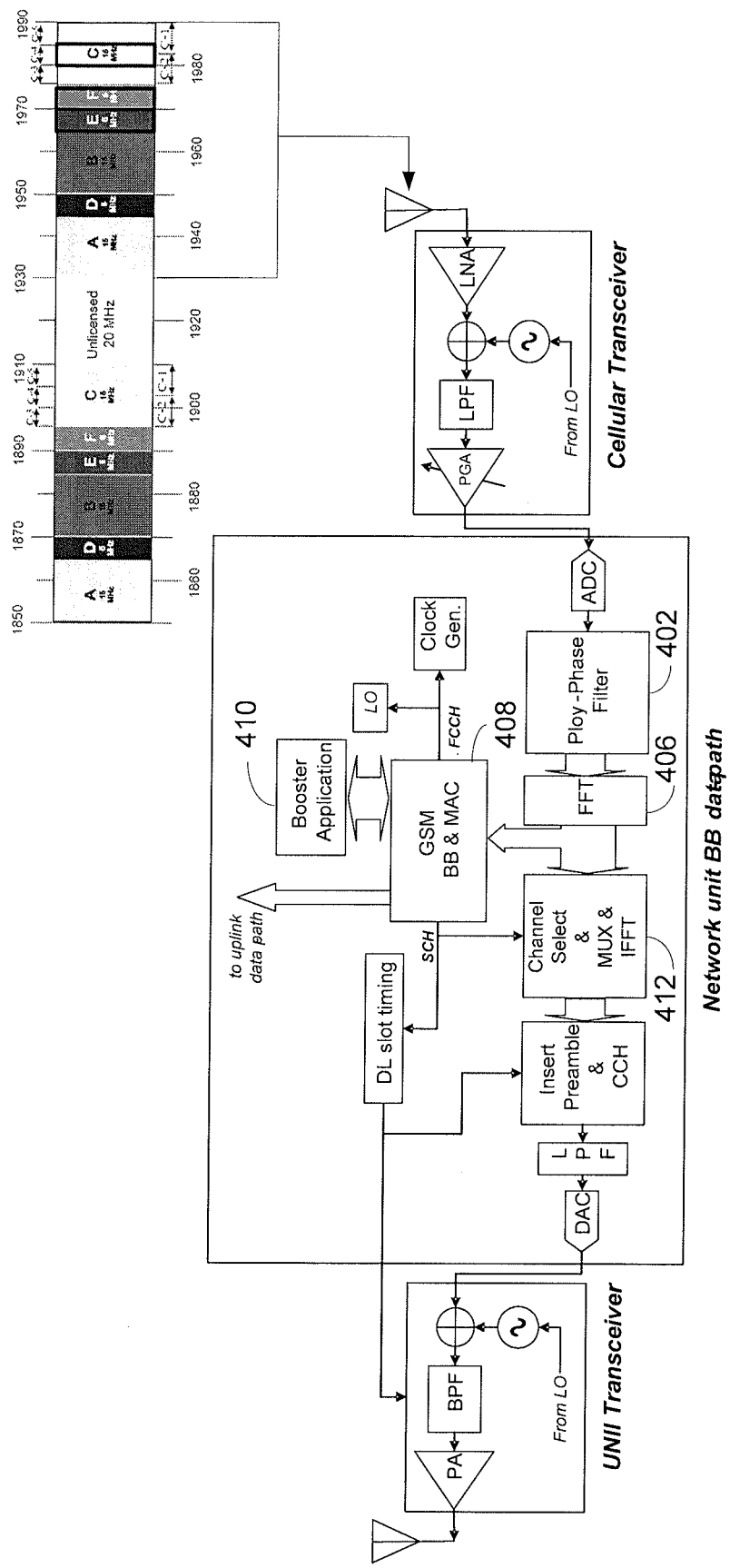
FIG. 4 shows an alternative Network unit downlink datapath.

An alternative implementation of a Network unit downlink datapath is shown in FIG. 4. In this implementation, instead of the "FCC & SCH & BCCH detection" module 308 of FIG. 3, which is a subset of the GSM baseband (BB) algorithms, a full GSM handset BB module 408, along with the MAC, is used, enabling the Network unit to decode Traffic (TCH) and other systems channels, as well as all the previously mentioned channels. The decoding of these additional channels enable Network unit to receive "dedicated" messages from the network. Further, the inclusion of the "GSM BB & MAC" module 408, along with a "Booster Application" module 410, enables the Network unit to set up a dedicated two-way communications link with the PLMN network, exchanging control and information (as well as physical layer messages) between the repeater (booster) and the network. These messages can belong to any of the layers, from application to physical layers.

The downlink datapath of the User unit is shown in FIG. 5. As the fading mitigation in the second hop is essential for an acceptable performance, the User unit UNII channel receiver would preferably have, at least a two-branch antenna diversity scheme such as Maximal Ratio Combining (MRC), even though it is possible to operate with a single branch receiver (No diversity), if the Rx SNR is sufficiently high.

The ADC 506 connected to each transceiver is in turn connected to three modules, a Radar Detection module 508, a Channel Estimation module 510, and an equalizer 512. The Radar Detection module 508 executes a radar detection algorithm to detect radar pulses. This algorithm can be based on simple RSSI, and the desired threshold, as the GSM requires a minimum 9 dB SNR to be maintained throughout the link. Closed-loop power control may be used to maintain the required SNR of the GSM channels in the UNII band, enabling radar detection.

Since the signal is in a time-dispersive channel, it is important to use the channel equalizer 512 on each branch of the receiver, before any diversity combining. The preamble transmitted at the beginning of each new transmit epoch is used for the training of the equalizer. This preamble is extracted by the Channel Estimation module 510. If the length of a given preamble is not sufficient, it is possible to use the preamble history, from previous stored transmit epochs, to obtain a larger preamble. It is also possible to use a long preamble at the beginning of the operation to converge to a set of equalizer weights, and thereafter using the shorter on-going preambles, track and converge for the small weight changes experienced in the short time between each transmission epoch. Further, as each GSM TS is around 577 gsec, provided that the transmit duration is more than several TS, it is possible that in one transmit epoch (say 11.54 msec), several (say 10) preambles be transmitted. The channel equalizer 512 can be based on simple Zero-Forcing algorithm, or for better noise performance in low SNR, a Minimum Mean Square Error (MMSE) algorithm can be used. Other equalization techniques can also be used. The equalizer 512 removes time dispersion, improving SNR and corrects the phase of each branch for the coherent combining.

After the coherent combining, a Control Channel (CCH) decoder 514 decodes the control channel, and the messages are used to configure a poly-phase filter 516, an FFT module 518, and a "DeMux & Channel Select & IFFT" module 520. The task of these modules are to channelize the incoming signal into 200 Mhz channels, change the sampling rate and demodulate the incoming channels to their original location, increase the sampling rate to support the new signal BW, and perform an inverse FFT. The same FCCH channel that was used in the Network unit to extract the reference frequency signal can be used in the User unit to extract the reference frequency, as detected by FCCH detection module 522. Otherwise, the preamble and/or the CCH can be used to frequency lock the two Network and User units. The time synchronization for switching the UNII transceivers-can also be based on the Preamble and/or the CCH symbol timing, and/or similar SCH detection block (not shown in FIG. 5). The output waveform is sent to a cellular transceiver for transmission via a DAC.

The uplink datapath will be similar to the downlink datapath, except for the following differences. In the User unit there is no need for "FCC & SCH & BCCH detection" module. Instead a RSSI estimation block is used to find the level and the timing of the uplink transmissions. The timing and RSSI level information are sent to the Network unit for the selection of the best switching time on the UNII link. In the Network unit there is no need for the "FCCH detection" module as both units are fully synchronized to the BTS by the virtue of the downlink datapath.

Figure 1:
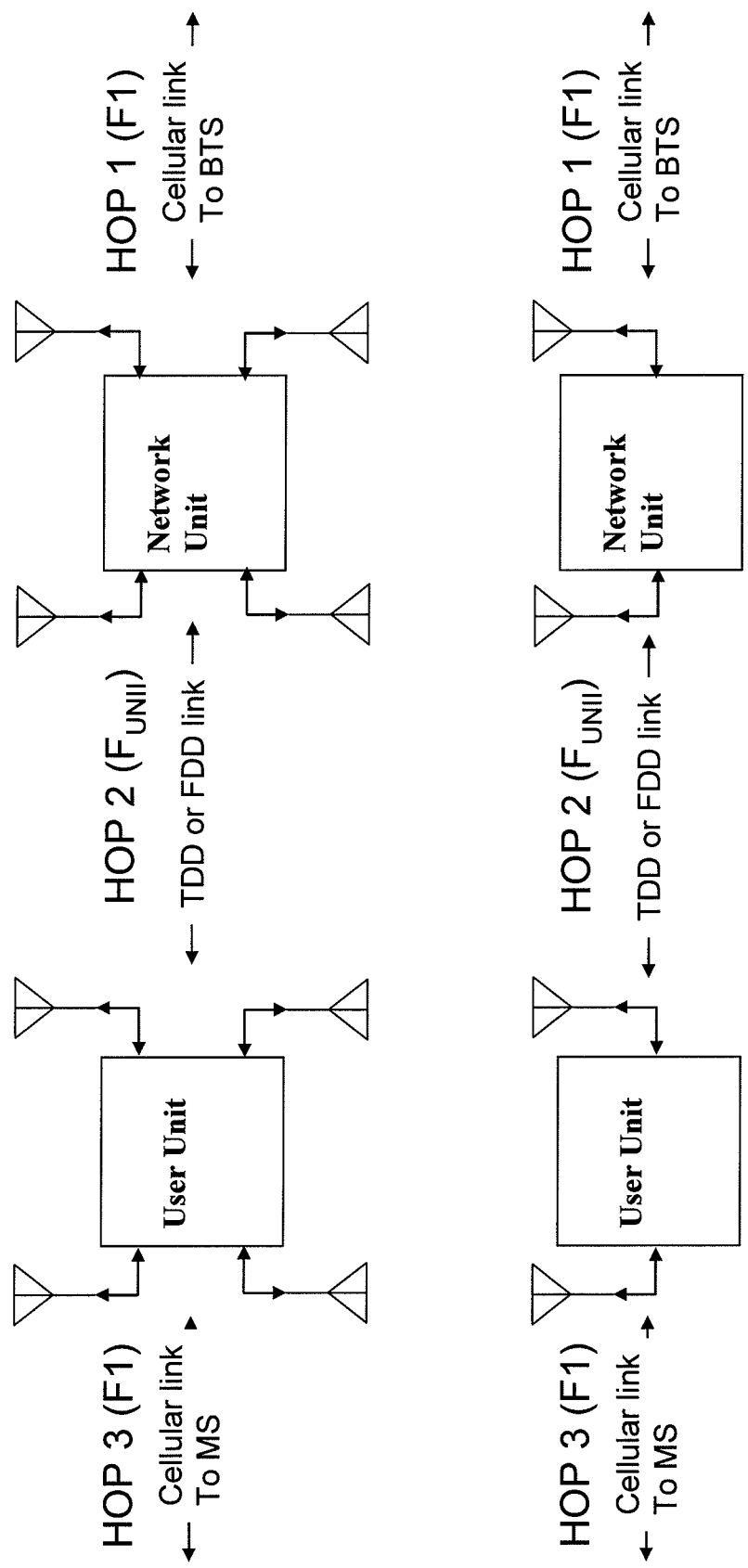
FIG. 1 shows a three-hop booster system.

The uplink signal can be watermarked, either at the User unit or Network unit or both. The uplink signal in a given channel or groups of channels can be watermarked according to any of a number of various techniques. A first such technique is variable delay (or delay hopping) watermarking. In variable delay watermarking, the uplink datapath has a middle hop (Hop 2 in FIG. 1) with a fixed latency. This latency can be changed in a pre-defined manner, giving an indication, at the receiver side, that the signal has been transmitted through Cell-Fi. As long as the variable latency is kept within the equalizer window of the GSM receiver (search window of WCDMA and CMDA RAKE receiver, and cyclic prefix or extension of OFDM systems such as WiMax), the receiver can track the changes even on a slot by slot basis. If the delay variations are based on a hopping sequence or information data, it is also possible to transfer information, such as repeater identity, to the network.

Another technique is blank-and-burst water marking. Referring back to FIGS. 3 and 4, the first three signal processing blocks of the downlink datapath, which are Polyphase Filter 304, 402, FFT 306, 406 and Channel Select & MUX & IFFT 314, 412. The same datapath can be used for the uplink of the repeater system. At the output of the FFT 306, 406 (or input to Channel Select & MUX & IFFT 314, 412), the RSSI of all the relevant channels can be monitor and the presence or absence of uplink time-slot(s) can be detected in all channels. This operation can be aided by the slot-timing information extracted previously. Once the presence of an uplink time-slot transmission is detected in a given channel, a known sequence, either a code or data, can be transmitted on the uplink instead of the original mobile transmitted signal (the burst). The replacement burst can have similar structure to the original GSM normal burst (or any other burst), or may share some, but not all, of the attributes (e.g. similar time duration, transmit power, etc.). These "replacement" bursts can then be detected at a dedicated receiver (or a modified BTS receiver) to reveal the watermarking information that has been inserted in a given uplink channel or group of channels. This is a blank-and-burst operation that removes the original uplink transmission(s), causing degradation to the communication link quality. However, the repetition rate of this operation can be such that the degradation is within acceptable levels for satisfactory operation of the end-to-end cellular link.

Yet another watermarking technique is dim-and-burst. The operation of the dim-and-burst technique is similar to the blank-and-burst technique, with the exception that only part of the time-slot is replaced by the watermarking signal. For instance, the watermarking signal can occupy up to one-half of the time slot, leaving the other half and the mid-amble for correct decoding of the data part. In this technique, the effect of the watermarking signal is less on the link quality.

Another watermarking technique is underlay signature. A GSM receiver requires 12 dB SNR (or Signal to Noise plus Interference (SNRI)) for a satisfactory demodulation and decoding of the received signal with an acceptable BER and link quality. Therefore, an underlay signature signal with 15 to 20 dB less power than a given burst power will have little impact on the link BER, but can be used as a watermark signal on a given channel. However, to detect such underlay signal, considerable processing gain is required, which usually is achieved by correlation and/or averaging (either coherent or none-coherent). Such signature can be inserted in a manner that is similar to the blank-and-burst technique, by first detecting an RSSI change in a given channel (i.e., at the output of the FFT block 306 in FIG. 3), and then inserting the code aligned with the time-slot. To enable coherent correlation over several time-slots, it is also possible to detect the mid-amble received phase of the received time-slot in a given uplink channel, and using this phase information, to insert a complex under-lay signature in phase with the mid-amble. This enables a receiver to detect the mid-amble phase, which is readily available, and use the detected mid-amble phase to coherently continue summing the received time-slots until the required processing gain is achieved. In order to reduce the latency in detection of the mid-amble phase, the underlay can be aligned with the second data portion of the time burst, giving a minimum of 60-bit long sequenced with each burst.

Although a few embodiments have been described in detail above, other modifications are possible. Other embodiments may be within the scope of the following claims.

What is claimed:

1. A repeater that mediates traffic between a network transceiver and a user transceiver in a cellular wireless communication network, the repeater comprising:
    a network unit having at least one wireless receiver and at least one wireless transmitter, the network unit being configured to communicate with the network transceiver;
    a user unit having at least one wireless receiver and at least one wireless transmitter, the user unit being configured to communicate with the user transceiver;
    a two-way communication path between the network unit and the user unit to communicate signals between the network transceiver and the user transceiver in autonomous hops comprising between the network transceiver and the network unit, between the user transceiver and the user unit, and between the network unit and the user unit;
    the hop between the network unit and the user unit being wireless for communicating a signal, and including each of wireless receivers of the user unit and the network unit using at least one channel equalizer to reduce propagation channel time dispersion and fading on the signal; and
    at least one of the network unit and the user unit being further configured to repeatedly transmit a training sequence to other unit of the network unit and the user unit to train the at least one channel equalizer of the other unit, the training sequence being transmitted in a guard time of a time division multiplexing communication on the hop between the user unit and the network unit, the guard time being between timeslots of the time division multiplexing communication.

2. The repeater according to claim 1, wherein the wireless receivers used for the hop between the network unit and the user unit use antenna space diversity to reduce propagation channel fading on the signal.

3. The repeater according to claim 1, wherein the time division multiplexing communication is performed by one or more time division multiplex communication systems that include Global System for Mobile communications (GSM) derivative systems.

4. The repeater according to claim 1, wherein the bi-directional control channel signaling is provided in the hop between the network unit and the user unit.

5. The repeater according to claim 4, wherein the bi-directional control channel signaling is transmitted in the guard time.

6. The repeater according to claim 1, wherein each of the network unit and the user unit further comprises:
    a first transceiver for communicating with the base transceiver system;
    an analog-to-digital converter to digitize radio frequency signals from the first transceiver;
    a polyphase filter module for filtering digitized radio frequency signals from the analog-to-digital converter;
    a fast fourier transform (FFT) module for performing an FFT operation on the filtered, digitized radio frequency signals;
    a channel selection, multiplexing and inverse FFT module for channelizing, multiplexing, and inverse transforming the output of the fast fourier transform module on the transmit side for selecting only the channels of interest from all possible available channels.

7. The repeater according to claim 6, wherein at least one of the network unit and the user unit is configured to watermark uplink signals communicated from the user unit to the network unit, and the network unit is configured to transmit the watermarked uplink signals to the base transceiver system.

8. The repeater according to claim 7, wherein the watermarked uplink signals comprise a watermark signal that includes changing a fixed latency of the communication path between the user unit and the network unit to a variable latency.

9. The repeater according to claim 8, wherein, wherein at least one of the network unit and the user unit is configured to add watermarking information into the variable latency.

10. The repeater according to claim 1, wherein the network unit further comprises:
    a first transceiver for communicating with the base transceiver system;
    an analog-to-digital converter to digitize radio frequency signals from the first transceiver;
    a polyphase filter module for filtering digitized radio frequency signals from the analog-to-digital converter;
    a fast fourier transform (FFT) module for performing an FFT operation on the filtered, digitized radio frequency signals;
    a channel selection, multiplexing and inverse FFT module for channelizing, multiplexing, and inverse transforming the output of the fast fourier transform module; and
    a Global System for Mobile communications (GSM) frequency control channel (FCCH) & synch channel (SCH) & broadcast control channel (BCCH) detection circuit being configured to operate in an downlink mode to detect uplink timeslots based on downlink signal bursts, and to replace at least one uplink signal burst within an uplink timeslot with a watermarking signal.

11. The repeater according to claim 10, wherein only half or less of the uplink timeslot is replaced with the watermarking signal.

12. The repeater according to claim 10, wherein the watermark of the uplink signals includes an underlay signature added to an uplink signal burst.

* * * * *